United States Patent
Saito

(10) Patent No.: US 7,811,364 B2
(45) Date of Patent: Oct. 12, 2010

(54) BUBBLE SEPARATOR

(75) Inventor: Yasuhiro Saito, Aichi-ken (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 204 days.

(21) Appl. No.: 12/238,558

(22) Filed: Sep. 26, 2008

(65) Prior Publication Data
US 2009/0120296 A1 May 14, 2009

(30) Foreign Application Priority Data
Nov. 12, 2007 (JP) .............................. 2007-293663

(51) Int. Cl.
*B01D 19/00* (2006.01)
(52) U.S. Cl. .............................. 96/174; 96/209; 96/212
(58) Field of Classification Search ................... 96/174, 96/209, 210, 211, 212; 95/261
See application file for complete search history.

(56) References Cited
U.S. PATENT DOCUMENTS 2,034,914 A * 3/1936 Lanser .......................... 96/174
5,000,766 A * 3/1991 Yano et al. ..................... 96/196
7,288,138 B2 * 10/2007 Showalter et al. .............. 96/1
7,288,139 B1 * 10/2007 Showalter ...................... 96/1
2008/0179227 A1 7/2008 Saito

FOREIGN PATENT DOCUMENTS

JP 2000-176204 A 6/2000

OTHER PUBLICATIONS

English language Abstract and translation JP 2000-176204 A.

* cited by examiner

*Primary Examiner*—Duane Smith
*Assistant Examiner*—Douglas J Thiesen
(74) *Attorney, Agent, or Firm*—Greenblum & Bernstein, P.L.C.

(57) ABSTRACT

A bubble separator is a cyclone-type bubble separator having a cooling mechanism (oil cooler) connected downstream thereof, and is provided with a relief mechanism that operates when the interior pressure in a main body increases. The fluid inside the main body escapes downstream of the cooling mechanism due to the operation of the cooling mechanism. In particular, preferably the relief mechanism is provided in a gas discharge portion that is connected to the main body.

11 Claims, 7 Drawing Sheets

BUBBLE SEPARATOR

INCORPORATION BY REFERENCE

The disclosure of Japanese Patent Application No. 2007-293663 filed on Nov. 12, 2007, including the specification, drawings and abstract is incorporated herein by reference in its entirety.

BACKGROUND OF THE INVENTION

1. Field of the Invention

The present invention relates to bubble separators, and in particular, relates to bubble separators that can prevent damage to a cooling mechanism that is connected downstream of the separator and can prevent over-cooling of a fluid.

2. Description of the Related Art

Conventionally, cyclone-type bubble separators are known that remove air bubbles contained in a gas-liquid mixed fluid that is introduced into a main body (refer, for example, to Patent Document 1). In addition, such bubble separators are also generally used to remove the air bubbles in lubricating oil in an internal combustion engine.

Here, the oil that is discharged from a lubricating path in an internal combustion engine normally has a temperature that exceeds a suitable temperature range. Thus, technology has been proposed in which, for example, as shown in FIG. 13, an oil cooler 109 is connected downstream of the bubble separator 101, oil from which the air bubbles have been removed by the bubble separator is cooled by the oil cooler 109 and the temperature of the oil is adjusted so as to fall within a suitable temperature range (refer, for example, to paragraph [0036] and FIG. 6 in Patent Document 1).

[Patent Document 1] Japanese Patent Application Publication No. JP-A-2000-176204

However, in the proposed technology described above, an oil cooler is simply connected downstream of the bubble separator, and thus, for example, during the start-up of the internal combustion engine, when the oil has a low temperature and a high viscosity, a loss of pressure that passes through the gaps in the oil cooler increases, and there is a concern that the oil cooler will be damaged. In addition, the low temperature oil is cooled by the oil cooler, and the oil is overcooled. Thus, time is consumed until the oil reaches a suitable temperature range.

SUMMARY OF THE INVENTION

In consideration of the circumstances described above, it is an object of the present invention to provide a bubble separator that can prevent damage to a cooling mechanism that is connected downstream of the separator and can prevent over-cooling of the fluid.

The present invention is as follows.

1. A cyclone-type bubble separator, to which a cooling mechanism is connected downstream thereof, comprising: a relief mechanism that operates when an interior pressure in a main body increases, wherein fluid inside said main body escapes downstream of said cooling mechanism due to the operation of said relief mechanism.

2. The bubble separator according to 1 above, wherein said relief mechanism is provided in a gas discharge portion that is connected to said main body.

3. The bubble separator according to 2 above, wherein said relief mechanism comprises a valve body that is disposed at a connecting section between a gas discharge passage in said gas discharge portion and a relief passage, that is urged by an elastic body, and that shifts due to the interior pressure in said main body, and when the interior pressure in said main body is less than a predetermined value, said gas discharge passage is opened and said relief passage is closed by said valve body, and when the interior pressure in said main body is equal to or greater than a predetermined value, said relief passage is opened by said valve body.

4. The bubble separator according to 3 above, wherein one end of said relief passage is connected to at least one of a fluid passage and a fluid retaining portion downstream of said cooling mechanism.

5. The bubble separator according to 2 above, wherein said relief mechanism comprises a valve body that is disposed in a gas discharge passage in said gas discharge portion, that is urged by an elastic body, and that shifts due to the interior pressure in said main body, and when the interior pressure in said main body is less than a predetermined value, said gas discharge passage is opened with a predetermined opening amount by said valve body, and when the interior pressure in said main body is equal to or greater than a predetermined value, the opening amount of said gas discharge passage is increased.

6. The bubble separator according to 5 above, wherein one end of said gas discharge passage opens at an upper portion of a fluid retaining portion downstream of said cooling mechanism.

7. The bubble separator according to 2 above, wherein said relief mechanism comprises a valve body that is disposed on a gas discharge passage in said gas discharge portion, that is urged by an elastic body, and that shifts due to the interior pressure in said main body, and that has a through hole formed therein for discharging the gas, and when the interior pressure in said main body is less than a predetermined value, said gas discharge passage is closed by said valve body, and when the interior pressure in said main body is equal to or greater than a predetermined value, said gas discharge passage is opened by said valve body.

8. The bubble separator according to 7 above, wherein one end of said gas discharge passage opens at an upper portion of a fluid retaining portion downstream of said cooling mechanism.

9. The bubble separator according to 1 above, wherein said relief mechanism is provided in a fluid discharge portion that is connected to said main body.

10. The bubble separator according to 9 above, wherein said relief mechanism comprises a valve body that is disposed at a connecting section between a fluid discharge passage in the fluid discharge portion and a relief passage, that is urged by an elastic body, and that shifts due to the interior pressure in said main body, and when the interior pressure in said main body is less than a predetermined value, said fluid discharge passage is opened and said relief passage is closed by said valve body, and when the interior pressure in said main body is equal to or greater than a predetermined value, said relief passage is opened by said valve body.

11. The bubble separator according to 10 above, wherein one end of said relief passage is connected to at least one of a fluid passage and a fluid retaining portion downstream of said cooling mechanism.

According to the bubble separator of the present invention, when a fluid that has been introduced into the main body has a high temperature, the bubble separation of the high temperature fluid is carried out in the main body, the fluid from which the air bubbles have been removed is cooled by the cooling mechanism that is connected downstream of the separator, and the temperature of the fluid is adjusted so as to fall within a suitable temperature range. In contrast, when the fluid that is introduced into the main body has a low temperature, the interior pressure in the main body increases, the relief mechanism operates, and the low-temperature fluid in the main body escapes downstream of the cooling mechanism. Thereby, the load on the cooling mechanism is decreased and it is possible to prevent damage thereto. In addition, it is possible to prevent overcooling of the low temperature liquid, and a rapid temperature rise can be realized.

In addition, in the case in which the relief mechanism is provided in the gas discharge portion that is connected to the main body, it is possible to structure the relief mechanism by using the gas discharge portion, and the relief mechanism and thus the separator can be provided with a simple and inexpensive structure. In addition, in comparison to providing the relief mechanism in a portion of the main body, it is possible to suppress reductions in the bubble separation performance.

In addition, there is a case in which the relief mechanism has a specific valve body and is structured such that, when the interior pressure in the main body is less than a predetermined value, the gas discharge passage is opened and the relief passage is closed by the valve body, and when the interior pressure in the main body is equal to or greater than a predetermined pressure, the relief passage is opened by the valve body. In this case, when the fluid that is introduced into the main body has a high temperature, the gas that has been separated inside the main body is discharged to the outside via the opened gas discharge passage. In contrast, when the fluid that is introduced into the main body has a low temperature, the fluid in the main body escapes downstream of the cooling mechanism via the opened relief passage. In this manner, the relief passage is provided separately from the gas discharge passage, and thus the low temperature fluid that passes through the relief passage is not exposed to the outside air and it is possible to suppress the incorporation of air bubbles into the fluid. In addition, a relief mechanism is used that has a valve body that is urged by an elastic body and that shifts due to the pressure inside the main body, and thus in comparison to providing an electromagnetic valve, the relief mechanism and thus the separator can be provided with a simple and inexpensive structure.

In addition, in the case in which one end of the relief passage is connected to the fluid passage or the fluid retaining portion downstream of the cooling mechanism, the low temperature fluid escapes to the fluid passage or the fluid retaining portion, which is connected downstream of the cooling mechanism, via the relief passage. Thereby, the low temperature fluid that passes through the relief passage can escape downstream of the cooling mechanism with no exposure to the outside air, and it is possible to suppress the incorporation of air bubbles into the fluid more reliably.

In addition, there is a case in the relief mechanism has a specific valve body, and the relief mechanism is structured such that, when the interior pressure in the main body is less than a predetermined value, the gas discharge passage is opened by a predetermined opening value by the valve body, and when the interior pressure in the main body is equal to or greater than a predetermined value, the amount of the opening of the gas discharge passage is increased by the valve body. In this case, when the fluid that is introduced into the main body has a high temperature, the gas that has been separated in the main body is discharged to the outside via the gas discharge passage that is opened with a predetermined amount. In contrast, when the fluid that is introduced into the main body has a low temperature, the fluid in the main body escapes downstream of the cooling mechanism via the opened discharge passage having an increased opening amount. In this manner, the gas discharge passage is also used as the relief passage, and thus, the relief mechanism and thus the separator can be provided with a simple and inexpensive structure. In addition, a relief mechanism is used that has a valve body that is urged by an elastic body and that shifts due to the pressure inside the main body. Therefore, in comparison to providing an electromagnetic valve, the relief mechanism and thus the separator can be provided with a simple and inexpensive structure.

In addition, there is a case in which the relief mechanism has a valve body with through holes for discharging the gas, and is structured such that, when the interior pressure in the main body is less than a predetermined value, the gas discharge passage is closed by the valve body, and when the interior pressure in the main body is equal to or greater than a predetermined pressure, the gas discharge passage is opened by the valve body. In this case, when the fluid that is introduced into the main body has a high temperature, the gas that has been separated in the main body is discharged to the outside via the through holes of the valve body that closes the gas discharge passage. In contrast, when the fluid that is introduced into the main body has a low temperature, the fluid in the main body escapes downstream of the cooling mechanism via the opened gas discharge passage. In this manner, the gas discharge passage is also used as the relief passage, and thus, the relief mechanism and thus the separator can be provided with a simple and inexpensive structure. In addition, a relief mechanism is used that has a valve body that is urged by an elastic body and that shifts due to the pressure inside the main body. Therefore, in comparison to providing an electromagnetic valve, the relief mechanism and thus the separator can be provided with a simple and inexpensive structure.

In addition, in the case in which one end of the gas discharge passage opens at the upper portion of the fluid retaining portion downstream of the cooling mechanism, the low temperature fluid is discharged at the upper portion of the fluid retaining portion via the gas discharge passage and escapes to the fluid retaining portion.

In addition, in the case in which the relief mechanism is provided in the fluid discharge portion that is connected to the main body, the relief mechanism can be structured by using the fluid discharge portion, and the relief mechanism and thus the separator can be provided with a simple and inexpensive structure. In addition, in comparison to providing the relief mechanism on a portion of the main body, it is possible to suppress a reduction in the bubble separating capacity.

In addition, there is a case in which the relief mechanism has a specific valve body, and the relief mechanism is structured such that, when the interior pressure in the main body is less than a predetermined value, the fluid discharge passage is opened and the relief passage is closed by the valve body, and when the interior pressure in the main body is equal to or greater than a predetermined pressure, the relief passage is opened by the valve body. In this case, when the fluid that is introduced into the main body has a high temperature, the fluid from which the air bubbles have been removed in the main body is discharged to the outside via the opened fluid discharge passage. In contrast, when the fluid that is introduced into the main body has a low temperature, the fluid inside the main body escapes downstream of the cooling mechanism via the opened relief passage. In addition, a relief mechanism is used that has a valve body that is urged by an elastic body and that shifts due to the pressure inside the main body. Therefore, in comparison to providing an electromagnetic valve, the relief mechanism and thus the separator can be provided with a simple and inexpensive structure.

In addition, in the case in which one end of the relief passage is connected to the fluid passage or the fluid retaining portion downstream of the cooling mechanism, the low temperature fluid escapes to the fluid passage or the fluid retaining portion that is connected downstream of the cooling mechanism via the relief passage

DETAILED DESCRIPTION OF THE PREFERRED EMBODIMENTS

1. Bubble Separator

Figure 1:
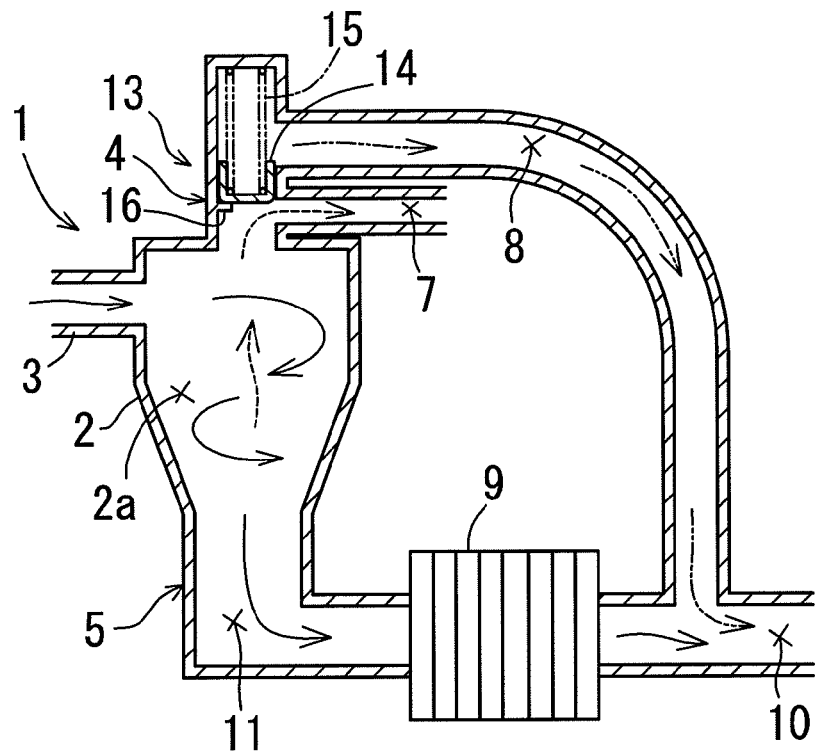
FIG. 1 is a longitudinal cross-sectional view of a bubble separator according to a first embodiment.

A bubble separator according to a first embodiment of the present invention is not particularly limited in terms of structure, shape, size and the like, provided that the bubble separator is a cyclone-type separator to which a cooling mechanism is connected downstream thereof. This bubble separator is provided with a relief mechanism that will be described later.

Note that the bubble separator described above can be provided, for example, with a main body; a fluid introduction portion that is connected to the main body and introduces a gas-liquid mixed fluid into the main body in a tangential direction; a gas discharge portion that is connected to the main body and discharges the gas that has been separated in the main body; and a fluid discharge portion that is connected to the main body and discharges fluid from which the air bubbles have been removed in the main body. Normally, a conical and/or columnar separating chamber is formed inside the main body.

The structure, cooling mode and the like of the "cooling mechanism" described above is not limited in particular provided that, for example, the cooling mechanism cools the fluid that is discharged from the bubble separator and from which the air bubbles have been removed. Normally, one end of the fluid discharge portion that is constitutes the bubble separator is connected upstream of the cooling mechanism.

Examples of a cooling mechanism include one of or a combination of two or more of: a configuration (1) in which a tube through which a fluid flows that has been discharged from the bubble separator described above and a tube through which a coolant medium (for example, cooling water, air or the like) flows are brought into contact; a configuration (2) in which a cooling fin that is in contact with outside air is provided in a tube through which a fluid flows that has been discharged from the bubble separator described above; and the like.

The cooling mechanism described above can be provided so as to cover at least a portion of the surface of a fluid tank that retains the fluid that has been discharged from the bubble separator (refer to FIG. 4), for example. Thereby, when a fluid has a low temperature, the cooling mechanism functions as heat buffer between the fluid and the external air because the circulation of the fluid inside the cooling mechanism ceases, and the cooling of the retained fluid in the fluid tank by external air can be alleviated.

The structure, layout, operation mode and the like of the "relief mechanism" are not limited in particular provided that the relief mechanism operates when the interior pressure in the main body that constitutes the bubble separator increases and due to such operation the fluid in the main body escapes downstream of the cooling mechanism.

The relief mechanism described above may include, for example, an electromagnetic valve that is controlled based on the pressure inside the main body, but preferably includes a valve body that is urged by an elastic body and that shifts (for example, sliding, vibrational movement or the like) due to the pressure inside the main body. This is because the relief mechanism and thus the separator with a simple and inexpensive structure can be provided by using the above configuration.

The relief mechanism may, for example, be provided in a portion of the main body that constitutes the bubble separator, but is preferably provided in the gas discharge portion or the fluid discharge portion, which are connected to the main body of the bubble separator. That is because by using the gas discharge portion or the fluid discharge portion, it is possible to set the relief mechanism simply, and it is possible to suppress reductions in the bubble separating capacity of the main body.

Here, the following configurations 1 to 3 can be provided as a relief mechanism that is provided in the gas discharge portion.

1. A configuration (refer to FIGS. 1 and 4, for example) including a valve body that is provided at the connecting section between the gas discharge passage in the gas discharge portion described above and the relief passage that is urged by an elastic body and that shifts due to the pressure inside the main body, wherein the gas discharge passage is opened and the relief passage is closed by the valve body when the interior pressure in the main body is less than a predetermined value, and the relief passage is opened by the valve body when the interior pressure in the main body is equal to or greater than a prescribed value.

2. A configuration (refer to FIG. 6, for example) including a valve body that is provided on the gas discharge passage in the gas discharge portion described above, that is urged by an elastic body, and that shifts due to the pressure inside the main body, wherein the gas discharge passage is opened with a predetermined opening amount by the valve body when the interior pressure in the main body is less than a prescribed value, and the opening amount of the gas discharge passage is increased when the interior pressure in the main body is equal to or greater than a prescribed amount.

3. A configuration (refer to FIG. 9) including a valve body that is disposed on the gas discharge passage in the gas discharge portion described above, that is urged by an elastic body, that shifts due to the pressure inside the main body, and in which through holes for discharging the gas are formed, wherein the gas discharge passage is closed by the valve body when the interior pressure in the main body is less than a predetermined value, and the gas discharge passage is opened by the valve body when the interior pressure in the main body is equal to or greater than a predetermined value.

Figure 4:
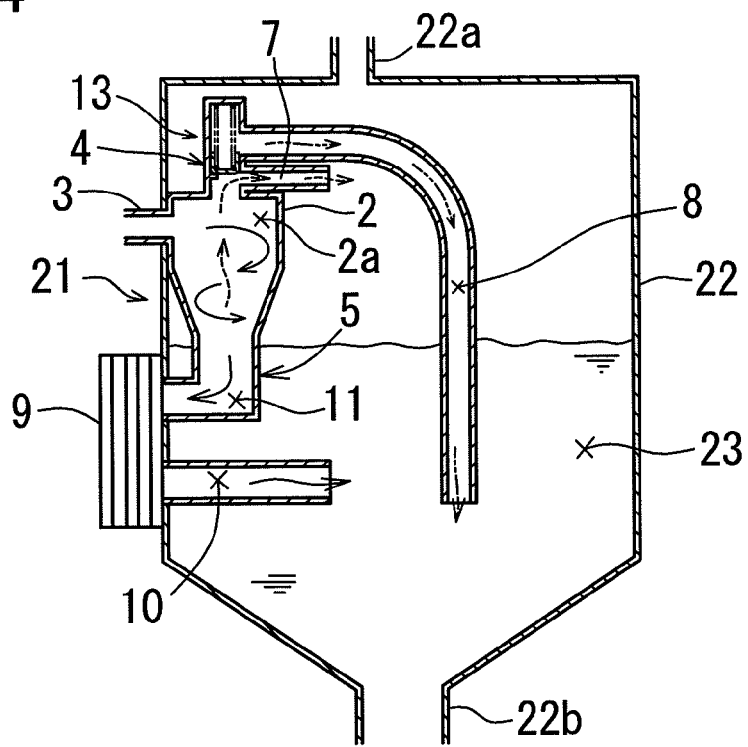
FIG. 4 is a longitudinal cross-sectional view of a bubble separator according to a second embodiment.

In configuration 1 described above, for example, one end of the relief passage is connected to the gas discharge passage and the other end thereof is connected to the fluid passage downstream of the cooling mechanism (refer to FIG. 1), or can be connected to the fluid retaining portion downstream of the cooling mechanism (refer to FIG. 4). In addition, for example, one end of the gas discharge passage is connected to the inside of the main body, the other end thereof is connected to the upper portion of the fluid retaining portion downstream of the cooling mechanism, and it is possible to open at the upper portion of the fluid retaining portion downstream of the cooling mechanism (refer to FIG. 4).

Figure 6:
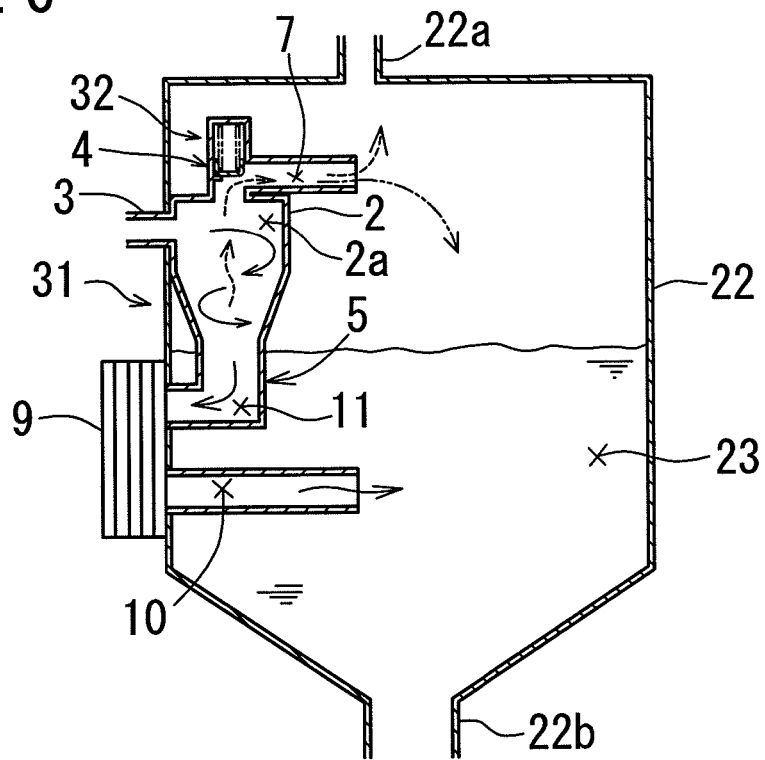
FIG. 6 is a longitudinal cross-sectional view of a bubble separator of an alternative mode.

In the configurations 2 and 3 described above, for example, one end of the gas discharge passage is connected to the inside of the main body, and the other end thereof can open at the upper portion of the fluid retaining portion downstream of the cooling mechanism (refer to FIG. 6).

In configuration 3 described above, the number, shape, size and the like of the through holes is not particularly limited, but preferably, from the viewpoint of facilitating the passage of gas and hindering the passage of fluid, a plurality of through holes are provided.

Note that in the configurations 1 to 3, for example, the bubble separator can be provided inside the fluid tank that retains the fluid that is discharged from the main body. Thereby, it is possible to ensure a disposition space for the bubble separator easily.

An example of a relief mechanism that is provided in the fluid discharge portion is a configuration (refer, for example, to FIG. 8) including a valve body that is provided at the connecting section between the fluid discharge passage in the fluid discharge portion and the relief passage, that is urged by an elastic body, and further, that shifts due to the pressure inside the main body, wherein the fluid discharge passage is opened and the relief passage is closed by the valve body when the interior pressure in the main body is less than a predetermined value and the relief passage is opened when the interior pressure in the main body is equal to or greater than a predetermined value.

In the case of the configuration described above, for example, one end of the relief passage is connected to the fluid discharge passage and the other end thereof is connected to the fluid passage downstream of the cooling mechanism (refer, for example, to FIG. 8), and the relief passage can be connected to a fluid retaining portion downstream of the cooling mechanism. Note that normally one end of the fluid discharge passage is connected to the inside of the main body and the other end thereof is connected upstream of the cooling mechanism.

Embodiments

Below, the present invention will be explained in detail by first through fourth embodiments with reference to the figures. Note that in the first through fourth embodiments, the "bubble separator" according to the present invention is illustrated by a bubble separator that removes the air bubbles that are contained in the lubricating oil of an internal combustion engine.

First Embodiment (1) Structure of the Bubble Separator

As shown in FIG. 1, a bubble separator 1 according to the first embodiment is provided with a main body 2 that has a substantially conical separation chamber 2a inside thereof. At the upper portion of the peripheral wall of this main body 2, an oil introduction portion 3 is provided that introduces the oil that contains air bubbles to the inside of the main body 2 in a tangential direction. In addition, at the center portion of the upper end wall of the main body 2, a gas discharge portion 4 is provided for discharging the gas that has been separated in the main body 2 to the outside. Furthermore, at the lower portion of the main body 2, a fluid discharge portion 5 is provided that discharges the oil that has been separated inside the main body to the outside A gas discharge passage 7 that has one end thereof connected to the inside of the main body 2 is provided in the gas discharge portion 4. The other end of the gas discharge passage 7 is connected to the upper portion of an oil tank (not illustrated). In addition, one end of a relief passage 8 is connected to the gas discharge portion 4. The other end of the relief passage 8 is connected to a fluid passage 10 downstream of a known oil cooler 9 (illustrated as the "cooling mechanism" according to the present invention). The fluid passage 10 is connected to the oil tank (not illustrated). In addition, a fluid discharge passage 11, which has one end thereof connected to the inside of the main body 2 and the other end thereof connected upstream of the oil cooler 9, is provided in the fluid discharge portion 5.

Figure 2:
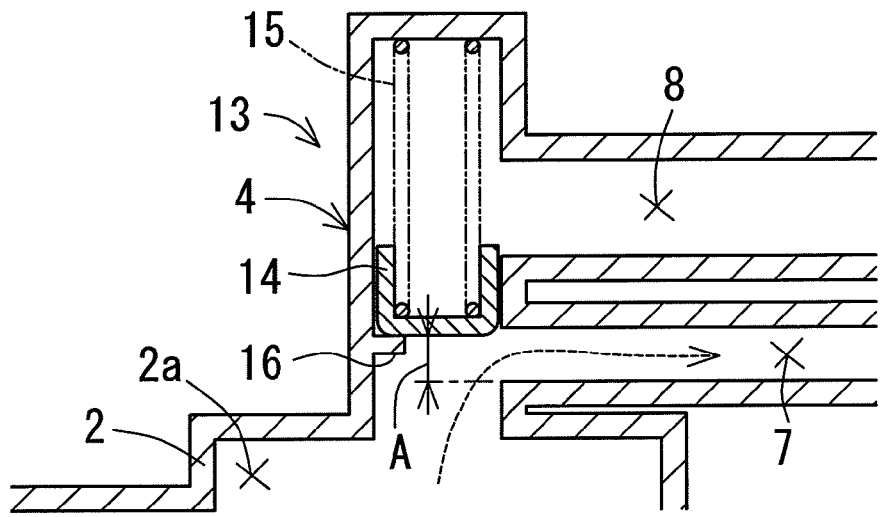
FIG. 2 is an enlarged view of essential components of FIG. 1, and shows the closed state of a relief passage.
Figure 3:
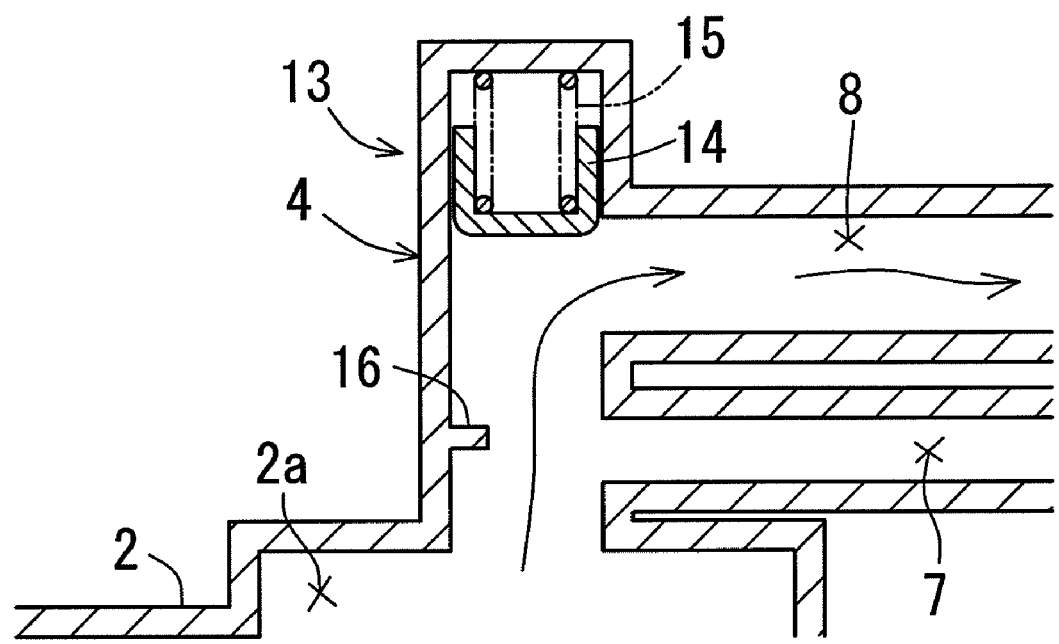
FIG. 3 is an enlarged view of the essential components of FIG. 1, and shows the opened state of the relief passage.

As shown in FIG. 2 a relief mechanism 13 that operates when the interior pressure in the main body 2 increases is provided in the gas discharge portion 4. This relief mechanism 13 includes a cap-shaped valve body 14 that is disposed at the connecting section of the gas discharge passage 7 and the relief passage 8. The valve body 14 is urged by a spring 15 and slides due to the interior pressure in the main body. In addition, when the interior pressure in the main body 2 is less than a predetermined value, the valve body 14 abuts a stopper 16 due to the urging force of the spring 15, and the gas discharge passage 7 is opened with a predetermined opening amount A (for example, an opening that is approximately 5 mm in diameter) while the relief passage 8 is closed. In contrast, when the interior pressure in the main body 2 is equal to or greater than a predetermined value, the valve body 14 slides overcoming the urging force of the spring 15, and, as shown in FIG. 3, the relief passage 8 is opened.

2. Operation of the Bubble Separator

Next, the operation of the bubble separator 1 having the structure described above will be explained.

First, in the case in which the oil that is introduced into the main body 2 has a high temperature, that is, in the case in which the interior pressure in the main body 2 is less than a predetermined value, as shown in FIG. 2, the valve body 14 abuts the stopper 16 due to the urging force of the spring 15, and the gas discharge passage 7 is opened while the relief passage 8 is closed by the valve body 14. In addition, as shown in FIG. 1, when the oil is introduced from the oil introduction portion 3 into the main body 2 in a tangential direction, due to the centrifugal force of this oil, the oil having a high specific gravity gathers toward the inside wall of the main body 2, and the air bubbles having a low specific gravity converge toward the center of the main body 2. As a result, the separated air bubbles are discharged to the outside of the main body 2 through the opened gas discharge passage 7 (shown by the broken arrows in FIG. 1). In addition, the oil from which the air bubbles have been separated in the main body 2 is fed to the oil cooler 9 via the fluid discharge passage 11, and after the oil has been cooled by the oil cooler 9 and the temperature of the oil has been adjusted so as to fall within a suitable temperature range, the oil is feed to the oil tank via the fluid passage 10 (shown by the solid arrows in FIG. 1).

In contrast, in the case in which the oil that is introduced into the main body 2 has a low temperature, the interior pressure in the main body 2 increases to become equal to or greater than a predetermined value, and the relief mechanism 13 operates. Specifically, as shown in FIG. 3, the valve body 14 slides overcoming the urging force of the spring 15, and the relief passage 8 is opened by the valve body 14. Thereby, the oil inside the main body 2 containing air bubbles is fed to the fluid passage 10 downstream of the oil cooler 9 via the relief passage 8 (shown by the phantom arrows in FIG. 1).

3. Effects of the Embodiment

In the bubble separator 1 of the first embodiment, the relief mechanism 13 is provided that operates when the interior pressure in the main body 2 increases, and when the oil that is introduced into the main body 2 has a low temperature, the low temperature oil inside the main body 2 (the oil that contains air bubbles) escapes downstream of the oil cooler 9 due to the operation of the relief mechanism 13. Therefore, it is possible to reduce the load on the oil cooler 9 and prevent damage thereto, and at the same time, it is possible to prevent overcooling of the low temperature oil and realize a rapid temperature rise. In addition, because it is possible to suppress increases in the interior pressure in the main body 2, it is possible to simplify the structure of the main body 2.

In addition, in the first embodiment, because the relief mechanism 13 is provided in the gas discharge portion 4, it is possible to support the valve body 14 so as to slide freely by using the gas discharge passage 7 for discharging the gas that has been separated inside the main body 2, and the relief mechanism 13 and thus the separator 1 can be provided with a simple and inexpensive structure. In addition, in comparison to providing the relief mechanism 13 on a portion of the main body 2, it is possible to suppress reductions in the bubble separating performance of the main body 2.

In addition, in the first embodiment, the relief mechanism 13 is used that includes the valve body 14 that is urged by the spring 15 and that shifts due to the interior pressure in the main body 2, and therefore, in comparison to providing an electromagnetic valve or the like, the relief mechanism 13 and thus the separator 1 can be provided with a simple and inexpensive structure. In addition, if the abutment position or the like of the valve body 14 is changed with respect to the stopper 16, the opening amount A of the gas discharge passage 7 can be easily adjusted by the valve body 14.

In addition, in the first embodiment, the relief passage 8 is provided separately from the gas discharge passage 7, and one end of the relief passage 8 is connected to the fluid passage 10 downstream of the oil cooler 9. Therefore, it is possible for the low temperature oil that passes through the relief passage 8 to escape downstream of the oil cooler 9 with no exposure to the outside air, and it is possible to suppress the incorporation of air bubbles into the oil.

Furthermore, in the first embodiment, the oil cooler 9 is connected downstream of the bubble separator 1 and the oil from which the air bubbles have been removed is cooled. Therefore, in comparison to removing air bubbles after cooling the oil, it is possible to suppress reductions in the cooling performance of the oil cooler 9.

Second Embodiment

Next, a bubble separator according to a second embodiment will be explained. Note that in the bubble separator according to the second embodiment, identical reference numerals are appended to structural parts that are substantially identical to those of the bubble separator of the first embodiment, and the explanations thereof are omitted.

As shown in FIG. 4, a bubble separator 21 according to the second embodiment is disposed inside an oil tank 22. This bubble separator 21 is provided with the main body 2, the oil introduction portion 3, the gas discharge portion 4, and the fluid discharge portion 5. A gas discharge outlet 22a that is provided at the upper portion of the oil tank 22 is connected to a blow-by gas passage (not illustrated). In addition, the oil discharge outlet 22b that is provided at the lower portion of the oil tank 22 is connected to a lubricating path for an internal combustion engine (not illustrated). In addition, the well-known oil cooler 9 is provided on the outer periphery of the oil tank 22 so as to cover a portion of the outer periphery thereof. One end of the fluid passage 10 downstream of this oil cooler 9 opens in an oil retaining portion 23 (illustrated as the "fluid retaining portion" according to the present invention) of the oil tank 22.

Figure 5:
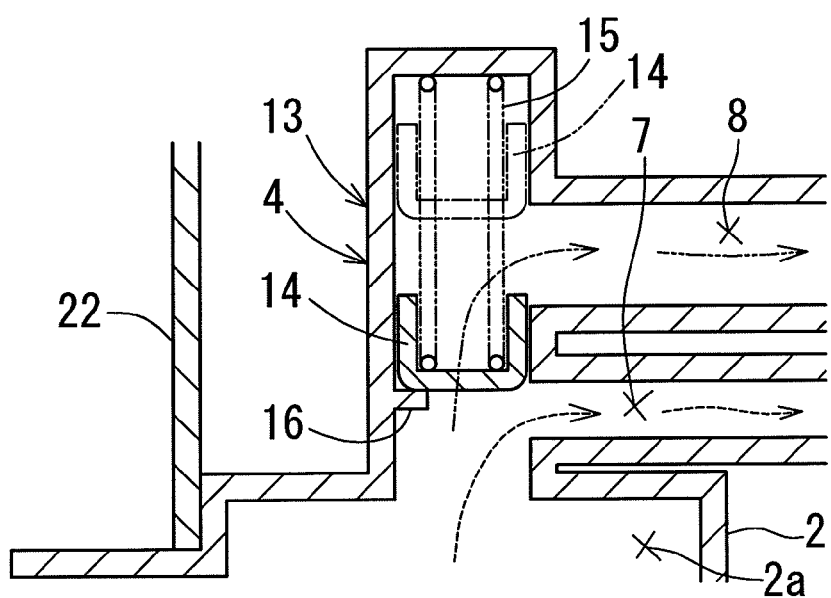
FIG. 5 is an enlarged view of the essential components of FIG. 4.

The gas discharge passage 7 having one end thereof linked to the inside of the main body 2 is provided in the gas discharge portion 4. The other end of the gas discharge passage 7 opens into the upper portion of the oil retaining portion 23 inside the oil tank 22. In addition, one end of the relief passage 8 is linked to the gas discharge portion 4. The other end of the relief passage 8 is connected to the oil retaining portion 23 inside the oil tank 22. In addition, as shown in FIG. 5, the relief mechanism 13, which has a structure that is substantially identical to that of the first embodiment described above, is provided in the gas discharge portion 4. In addition, the fluid discharge passage 11 is provided in the fluid discharge portion 5, where one end of the fluid discharge passage 11 is connected to the inside of the main body 2 and the other end thereof is connected upstream of the oil cooler 9.

Note that in the second embodiment, one end of the relief passage 8 is inserted into and connected to the oil retaining portion 23. However, the present invention is not limited to this, and for example, one end of the relief passage 8 may be connected to the fluid passage 10 downstream of the oil cooler 9.

2. Operation and Effects of the Bubble Separator

Next, the operation of the bubble separator 21 having the structure described above will be explained.

First, in the case in which the oil that is introduced into the main body 2 has a high temperature, that is, in the case in which the interior pressure in the main body 2 is less than a predetermined value, as shown by the solid lines in FIG. 5, the gas discharge passage 7 is opened and the relief passage 8 is closed by the valve body 14. In addition, as shown in FIG. 4, when the oil is introduced from the oil introduction portion 3 into the main body 2 in a tangential direction, the air bubbles that have been separated in the main body 2 are discharged into the oil tank 22 through the gas discharge passage 7, and fed from the gas discharge outlet 22*a* to a blow-by gas passage (not illustrated), as shown by the broken arrow in FIG. 4. In addition, the oil from which the air bubbles have been removed in the main body 2 is fed to the oil cooler 9 via the fluid discharge passage 11, and after the temperature of the oil has been adjusted so as to fall within a suitable temperature range by being cooled by the oil cooler 9, the oil is fed to the oil retaining portion 23 of the oil tank 22 via the fluid passage 10 (shown by the solid arrows in FIG. 4).

In contrast, in the case in which the oil that is introduced into the main body 2 has a low temperature, the interior pressure in the main body 2 increases so as to become equal to or greater than a predetermined value, and the relief mechanism 13 operates. Specifically, as shown by the phantom lines in FIG. 5, the valve body 14 slides overcoming the urging force of the spring 15, and the relief passage 8 is opened by this valve body 14. Thus, the oil that contains air bubbles in the main body 2 is fed into the oil retaining portion 23 downstream of the oil cooler 9 via the relief passage 8 (shown by the phantom arrows in FIG. 4).

According to the above, in the bubble separator 21 of the second embodiment, in addition to exhibiting the operation and effects that are substantially identical to those of the first embodiment described above, because the bubble separator 21 is provided inside the oil tank 22, it is possible to ensure an installation space for the bubble separator 21 easily, and it is possible to realize a down-sizing of the engine compartment and the like. In addition, because one end of the relief passage 8 is inserted into the oil retaining portion 23 and opens downward, when discharging the low temperature oil from the relief passage 8, the low temperature oil is discharged in a direction that is separated from the oil surface inside the oil retaining portion 23, and thus it is possible to suppress the re-incorporation of air bubbles by lowering the turbulence of the oil surface.

Third Embodiment

1. Structure of the Bubble Separator

Next, a bubble separator according to a third embodiment will be explained. Note that in the bubble separator according to the third embodiment, identical reference numerals are appended to structural parts that are substantially identical to those of the bubble separator of the first embodiment, and the explanations thereof are omitted.

Figure 7:
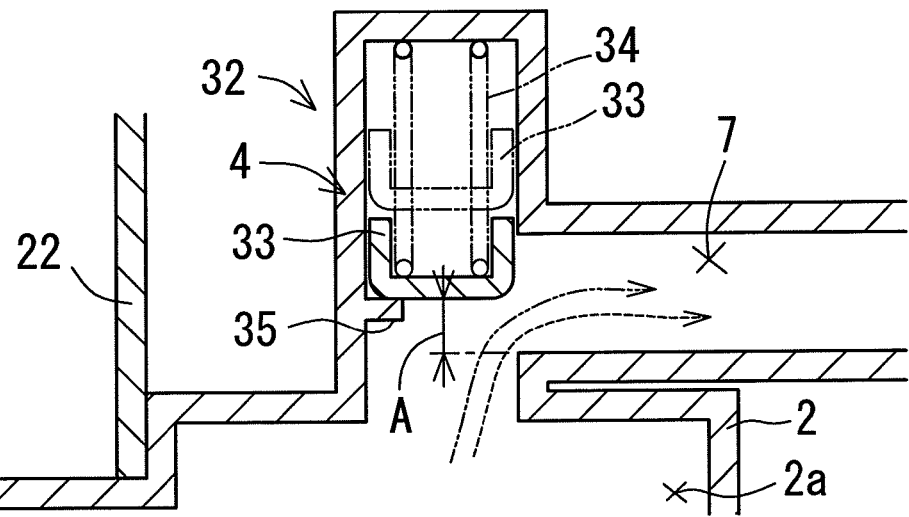
FIG. 7 is an enlarged view of the essential components of FIG. 6.

As shown in FIG. 6, only the gas discharge passage 7 that has one end thereof connected to the inside of the main body 2 is provided in the gas discharge portion 4 of a bubble separator 31 according to the third embodiment. The other end of the gas discharge passage 7 opens into the upper portion of the oil retaining portion 23 inside the oil tank 22. In addition, as shown in FIG. 7, a relief mechanism 32 that operates when the internal pressure in the main body 2 increases is provided in the gas discharge portion 4. This relief mechanism 32 includes a cap-shaped valve body 33 that is disposed in the gas discharge passage 7. The valve body 33 is urged by a spring 34 and slides due to the interior pressure in the main body 2. In addition, when the interior pressure in the main body 2 is less than a predetermined value, the valve body 33 abuts a stopper 35 due to the urging force of the spring 34 (shown by the solid lines in the figure), and the gas discharge passage 7 is opened with a predetermined opening amount A (for example, an opening that is approximately 5 mm in diameter). In contrast, when the interior pressure in the main body 2 is equal to or greater than a predetermined value, the valve body 33 slides overcoming the urging force of the spring 34 (shown by the phantom line in the figure), and the gas discharge passage 7 is fully opened.

2. Operation and Effects of the Bubble Separator

Next, the operation of the bubble separator 31 that has the structure described above will be explained.

First, in the case in which the oil that is introduced into the main body 2 has a high temperature, that is, in the case in which the interior pressure in the main body 2 is less than a predetermined value, as shown by the solid lines in FIG. 7, the gas discharge passage 7 is opened with a predetermined opening amount A by the valve body 33. In addition, as shown in FIG. 6, when the oil is introduced from the oil introduction portion 3 into the main body 2 in a tangential direction, the air bubbles that have been separated in the main body 2 are discharged into the oil tank 22 through the gas discharge passage 7, and fed from the gas discharge outlet 22*a* to the blow-by gas passage (not illustrated) (shown by the broken arrows in FIG. 6). In addition, the oil from which the air bubbles have been removed in the main body 2 is fed to the oil cooler 9 via the fluid discharge passage 11, and after the temperature of the oil has been adjusted so as to fall within an appropriate temperature range by being cooled by the oil cooler 9, the oil is fed to the oil retaining portion 23 of the oil tank 22 via the fluid passage 10 (shown by the solid arrows in FIG. 6).

In contrast, in the case in which the oil that is introduced into the main body 2 has a low temperature, the interior pressure in the main body 2 increases to become equal to or greater than a predetermined value, and the relief mechanism 32 operates. Specifically, as shown by the phantom lines in FIG. 7, the valve body 33 slides overcoming the urging force of the spring 34, and the gas discharge passage 7 is fully opened by the valve body 33. Thus, the oil that contains air bubbles in the main body 2 is released into the upper portion of the oil retaining portion 23 downstream of the oil cooler 9 via the gas discharge passage 7 (shown by the phantom arrows in FIG. 6).

According to the above, in the bubble separator 31 of the third embodiment, in addition to exhibiting an operation and effects that are substantially identical to those in the first and second embodiments, because the gas discharge passage 7 is also used as a relief passage, the relief mechanism 32 and thus the separator 31 can be provided with a simple and inexpensive structure.

Fourth Embodiment

1. Structure of the Bubble Separator

Next, a bubble separator according to a fourth embodiment will be explained. Note that in the bubble separator according to the fourth embodiment, identical reference numerals are appended to structural parts that are substantially identical to those of the bubble separator of the first embodiment, and the explanations thereof are omitted.

Figures 8, 9:
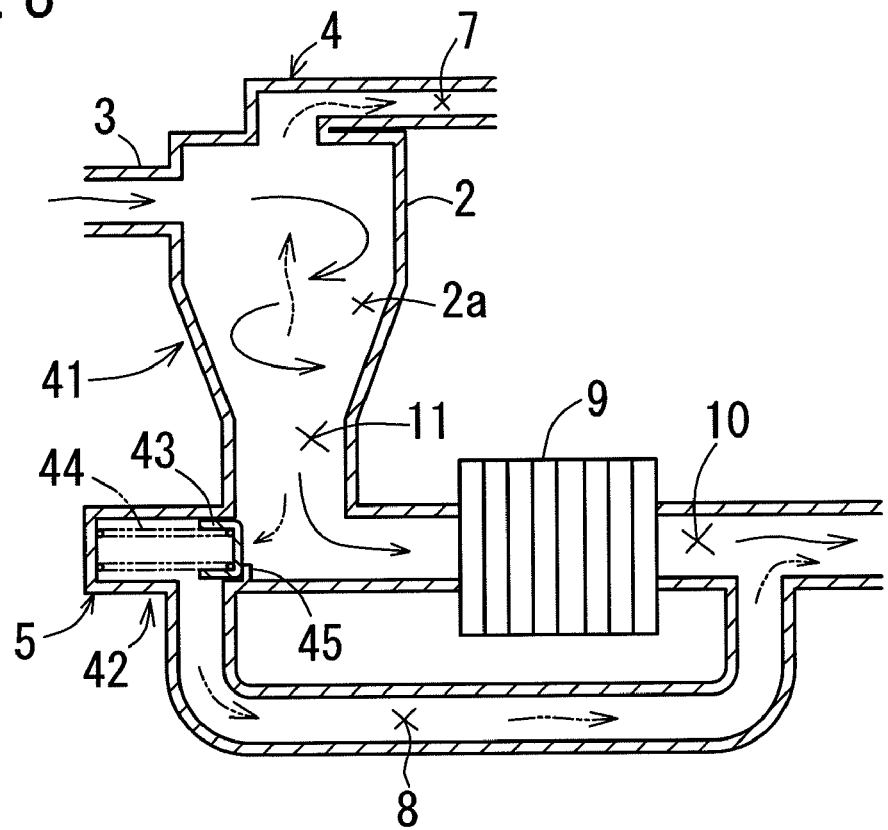
FIG. 8 is a longitudinal cross-sectional view of a bubble separator of an alternative mode.
FIG. 9 is an explanatory drawing for explaining a relief mechanism of an alternative mode.

In a bubble separator 41 according to the fourth embodiment, as shown in FIG. 8, the relief passage 8 is provided so as to communicate the fluid discharge passage 11 upstream of the oil cooler 9 and the fluid passage 10 downstream of the oil cooler 9. In addition, a relief mechanism 42 is provided in the fluid discharge portion 5 of the bubble separator 41. The relief mechanism 42 includes a cap-shaped valve body 43 that is disposed at the connecting section between the fluid discharge passage 11 and the relief passage 8. The valve body 43 is urged by a spring 44 and slides due to the interior pressure in the main body 2. In addition, when the interior pressure in the main body 2 is less than a predetermined value, the valve body 43 abuts a stopper 45 due to the urging force of the spring 44, and the fluid discharge passage 11 is opened and the relief passage 8 is closed. In contrast, when the interior pressure in the main body 2 becomes equal to or greater than a predetermined value, the valve body 43 slides overcoming the urging force of the spring 44, and the relief passage 8 is opened.

2. Operation and Effects of the Bubble Separator

Next, the operation of the bubble separator 41 that has the structure described above will be explained.

First, in the case in which the oil that is introduced into the main body 2 has a high temperature, that is, in the case in which the interior pressure in the main body 2 is less than a predetermined value, the fluid discharge passage 11 is opened. In addition, as shown in FIG. 8, when the oil is introduced from an oil introduction portion 3 into the main body 2 in a tangential direction, the air bubbles that have been separated in the main body 2 are discharged to the outside of the main body 2 through the gas discharge passage 7 (shown by the broken arrows in FIG. 8). In addition, the oil from which the air bubbles have been removed in the main body 2 is fed to the oil cooler 9 via the fluid discharge passage 11, and after the temperature of the oil has been adjusted so as to fall within a suitable temperature range by being cooled by the oil cooler 9, the oil is fed to the oil retaining portion 23 of the oil tank 22 via the fluid passage 10 (shown by the solid arrows in FIG. 8).

In contrast, in the case in which the oil that is introduced into the main body 2 has a low temperature, the interior pressure in the main body 2 increases to become equal to or greater than a predetermined value, and the relief mechanism 42 operates. That is, the valve body 43 slides overcoming the urging force of the spring 44, and the relief passage 8 is opened by the valve body 43. Thus, the oil in the main body 2 that contains air bubbles is fed to the fluid passage 10 downstream of the oil cooler 9 via the relief passage 8 (shown by the phantom arrow in FIG. 8).

According to the above, in the bubble separator 41 of the fourth embodiment, it is possible to elicit the operation and effects that are substantially identical to those of the first through third embodiments.

Note that the present invention is not limited to the first through fourth embodiments, and, depending on the object and use, various modifications of the embodiments are possible within the scope of the present invention. Specifically, in the third embodiment described above (refer to FIG. 6), in a configuration in which the gas discharge passage 7 is also used as the relief passage, the relief mechanism 32 that changes the amount of the opening of the gas discharge passage 7 is illustrated. However, the present invention is not limited to this, and for example, as shown in FIG. 9, a relief mechanism 48 is also possible that has a valve body 47 in which a plurality of through holes 47a for discharging the gas are formed. In this configuration, in the case in which the oil that is introduced into the main body 2 has a high temperature, that is, in the case in which the interior pressure in the main body 2 is less than a predetermined value, the valve body 47 abuts the stopper 35 due to the urging force of the spring 34, the gas discharge passage 7 is closed due to the valve body 47, and the air bubbles that were separated in the main body 2 are discharged into the oil tank 22 through the gas discharge passage 7 via the through holes 47a in the valve body 47 (shown by the broken arrows in the figure). In contrast, in the case in which the oil that is introduced into the main body 2 has a low temperature, that is, in the case in which the interior pressure in the main body 2 increases to become equal to or greater than a predetermined value, the valve body 47 slides overcoming the urging force of the spring 34, the gas discharge passage 7 is opened, and the oil inside the main body 2 that contains air bubbles is released into the upper portion of the oil retaining portion 23 that is provided downstream of the oil cooler 9 via the gas discharge passage 7 (shown by the phantom arrows in the figure).

Figure 10:
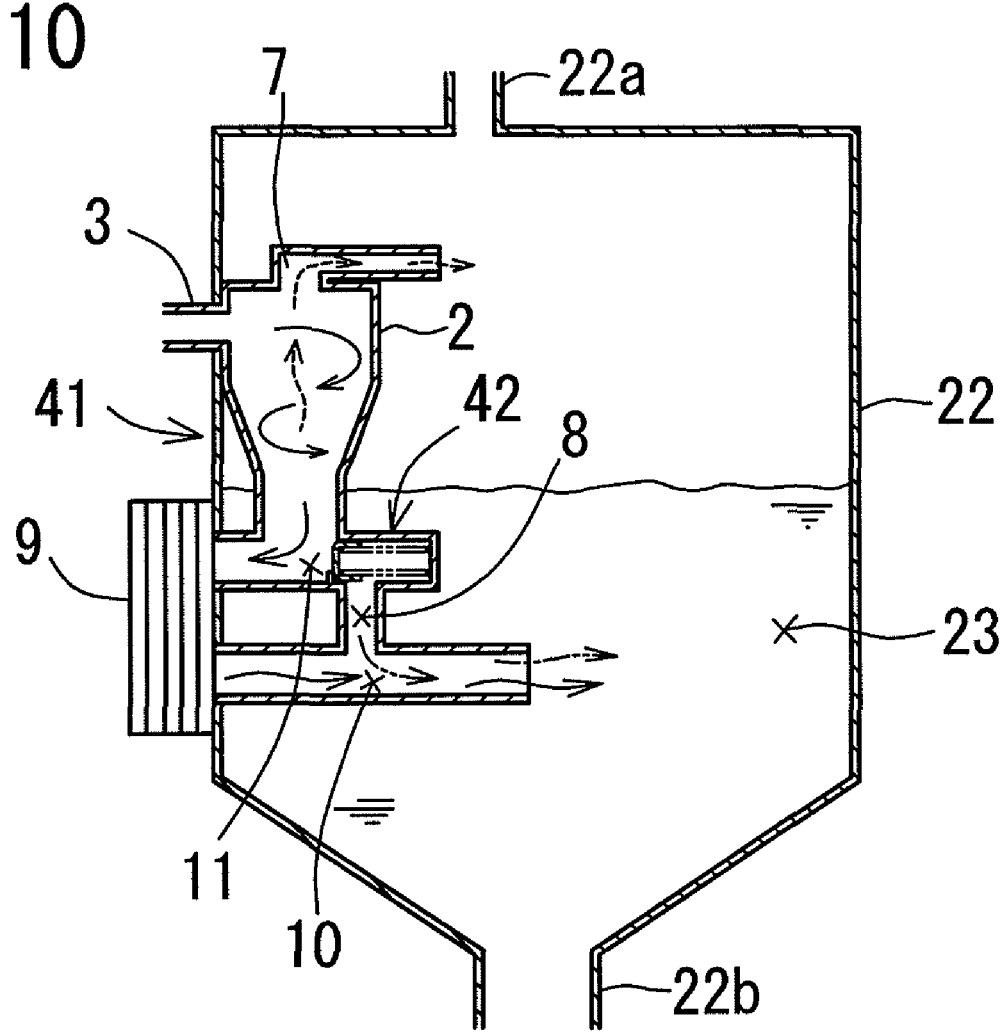
FIG. 10 is a longitudinal cross-sectional view of a bubble separator of yet another alternative mode.

In addition, in the fourth embodiment (refer to FIG. 8), the bubble separator 41 that is separate from the oil tank 22 is illustrated. However, the present invention is not limited to this, and, for example, as shown in FIG. 10, the bubble separator 41 may be disposed inside the oil tank 22. In this case, one end of the relief passage 8 communicates with the fluid discharge passage 11 and the other end thereof is connected to the fluid passage 10 downstream of the oil cooler 9. Note that the other end of the relief passage 8 may open directly into the oil retaining portion 23, which is downstream of the oil cooler 9.

Figure 11:
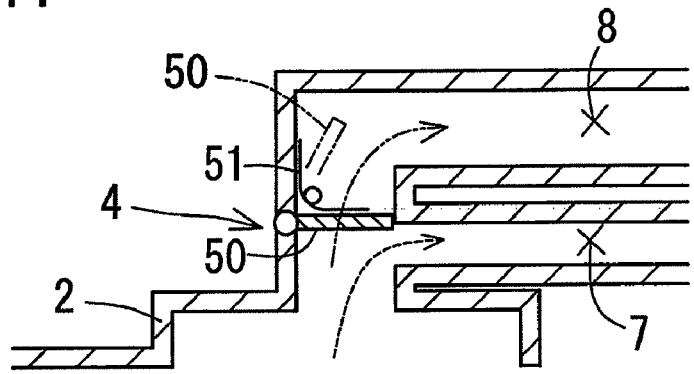
FIG. 11 is an explanatory drawing for explaining a relief mechanism for yet another alternative mode.

In addition, in the first through fourth embodiments, the valve bodies 14, 33, and 43 that are supported so as to slide freely are illustrated. However, the present invention is not limited to this, and, for example, as shown in FIG. 11, a valve body 50 that is supported so as to swing freely on the gas discharge portion 4 (or the fluid discharge portion 5) and is urged by a spring 51 may be used.

Figure 12:
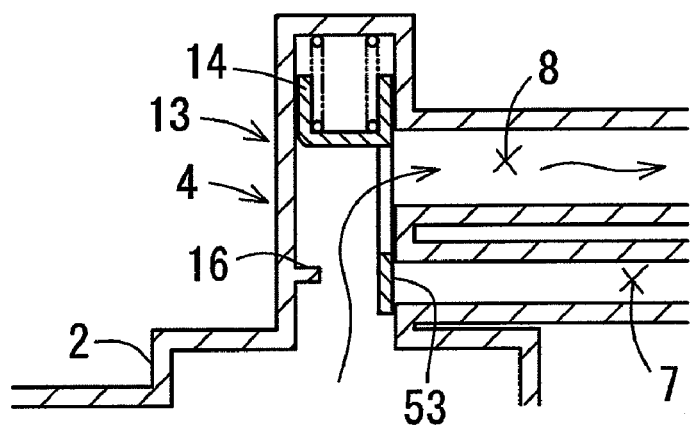
FIG. 12 is an explanatory drawing for explaining a relief mechanism for yet another alternative mode.
Figure 13:
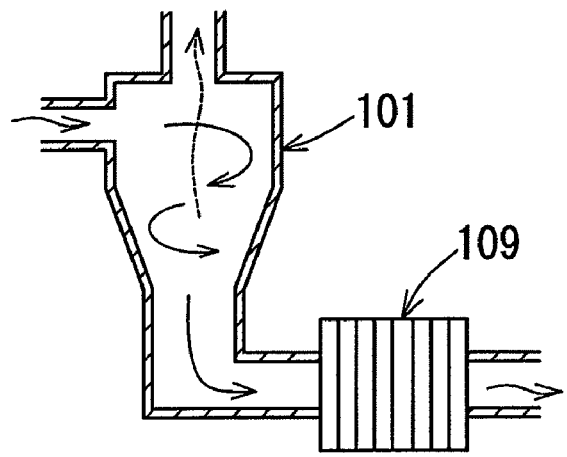
FIG. 13 is an explanatory drawing for explaining a conventional bubble separator.

Furthermore, in the first and second embodiments, the relief passage 8 and the gas discharge passage 7 are both opened during the operation of the relief mechanism 13. However, the present invention is not limited to this, and, for example, as shown in FIG. 12, the valve body 14 may be configured such that a shutter piece 53 is provided on the valve body 14, and the gas discharge passage 7 is closed by the shutter piece 53 and only the relief passage 8 is opened during the operation of the relief mechanism 13.

The invention may be widely used as a technology that removes air bubbles that are contained in a gas-fluid mixed liquid. In particular, the invention may be advantageously used as a technology in which air bubbles that are contained in lubricating oil in an internal combustion engine are removed.

What is claimed is:

1. A cyclone-type bubble separator, to which a cooling mechanism is connected downstream thereof, comprising:
    a relief mechanism that operates when an interior pressure in a main body increases, wherein
    fluid inside said main body escapes downstream of said cooling mechanism due to the operation of said relief mechanism.

2. The bubble separator according to claim 1, wherein said relief mechanism is provided in a gas discharge portion that is connected to said main body.

3. The bubble separator according to claim 2, wherein
    said relief mechanism comprises a valve body that is disposed at a connecting section between a gas discharge passage in said gas discharge portion and a relief passage, that is urged by an elastic body, and that shifts due to the interior pressure in said main body, and
    when the interior pressure in said main body is less than a predetermined value, said gas discharge passage is opened and said relief passage is closed by said valve body, and when the interior pressure in said main body is equal to or greater than a predetermined value, said relief passage is opened by said valve body.

4. The bubble separator according to claim 3, wherein one end of said relief passage is connected to at least one of a fluid passage and a fluid retaining portion downstream of said cooling mechanism.

5. The bubble separator according to claim 2, wherein
said relief mechanism comprises a valve body that is disposed in a gas discharge passage in said gas discharge portion, that is urged by an elastic body, and that shifts due to the interior pressure in said main body, and when the interior pressure in said main body is less than a predetermined value, said gas discharge passage is opened with a predetermined opening amount by said valve body, and when the interior pressure in said main body is equal to or greater than a predetermined value, the opening amount of said gas discharge passage is increased.

6. The bubble separator according to claim 5, wherein one end of said gas discharge passage opens at an upper portion of a fluid retaining portion downstream of said cooling mechanism.

7. The bubble separator according to claim 2, wherein
said relief mechanism comprises a valve body that is disposed on a gas discharge passage in said gas discharge portion, that is urged by an elastic body, and that shifts due to the interior pressure in said main body, and that has a through hole formed therein for discharging the gas, and when the interior pressure in said main body is less than a predetermined value, said gas discharge passage is closed by said valve body, and when the interior pressure in said main body is equal to or greater than a predetermined value, said gas discharge passage is opened by said valve body.

8. The bubble separator according to claim 7, wherein one end of said gas discharge passage opens at an upper portion of a fluid retaining portion downstream of said cooling mechanism.

9. The bubble separator according to claim 1, wherein said relief mechanism is provided in a fluid discharge portion that is connected to said main body.

10. The bubble separator according to claim 9, wherein
said relief mechanism comprises a valve body that is disposed at a connecting section between a fluid discharge passage in the fluid discharge portion and a relief passage, that is urged by an elastic body, and that shifts due to the interior pressure in said main body, and when the interior pressure in said main body is less than a predetermined value, said fluid discharge passage is opened and said relief passage is closed by said valve body, and when the interior pressure in said main body is equal to or greater than a predetermined value, said relief passage is opened by said valve body.

11. The bubble separator according to claim 10, wherein one end of said relief passage is connected to at least one of a fluid passage and a fluid retaining portion downstream of said cooling mechanism.

* * * * *